(12) United States Patent (10) Patent No.: US 11,860,290 B2
Luebke et al. (45) Date of Patent: Jan. 2, 2024

(54) DETERMINING POSITIONS USING ROTATING ANTENNA ARRAY

(71) Applicant: Lazer Layout, LLC, Logan, UT (US)

(72) Inventors: Michael A Luebke, Pleasant Grove, UT (US); Kevin R. Hicken, Logan, UT (US)

(73) Assignee: Lazer Layout, LLC, Logan, UT (US)

( * ) Notice: Subject to any disclaimer, the term of this patent is extended or adjusted under 35 U.S.C. 154(b) by 0 days.

(21) Appl. No.: 18/050,976

(22) Filed: Oct. 28, 2022

(65) Prior Publication Data

US 2023/0138683 A1  May 4, 2023

Related U.S. Application Data

(60) Provisional application No. 63/263,194, filed on Oct. 28, 2021.

(51) Int. Cl.
*G01S 5/06* (2006.01)
*H04N 9/31* (2006.01)
*H01Q 21/28* (2006.01)

(52) U.S. Cl.
CPC ............... *G01S 5/06* (2013.01); *H01Q 21/28* (2013.01); *H04N 9/31* (2013.01)

(58) Field of Classification Search
CPC ............. G01S 5/06; H01Q 21/28; H04N 9/31
See application file for complete search history.

(56) References Cited

U.S. PATENT DOCUMENTS

| 6,021,330 | A | * | 2/2000 | Vannucci | H04W 64/00 |
| | | | | | 455/456.2 |
| 6,845,239 | B1 | * | 1/2005 | Sato | G01S 5/06 |
| | | | | | 455/67.11 |
| 10,186,027 | B1 | * | 1/2019 | Hicken | G06T 7/60 |
| 2005/0128074 | A1 | * | 6/2005 | Culpepper | G08B 21/0269 |
| | | | | | 340/539.1 |
| 2015/0304979 | A1 | * | 10/2015 | Kumar | G01S 5/0273 |
| | | | | | 455/456.1 |
| 2021/0050664 | A1 | * | 2/2021 | Lin | H01Q 21/28 |
| 2022/0190488 | A1 | * | 6/2022 | Zhu | H01Q 21/26 |

OTHER PUBLICATIONS

Concentric. (2016). The American Heritage Dictionary of the English Language (6th ed.). Houghton Mifflin. Credo Reference: https://search.credoreference.com/content/entry/hmdictenglang/concentric/0 (Year: 2016).*

* cited by examiner

*Primary Examiner* — Bernarr E Gregory
*Assistant Examiner* — Fred H Mull
(74) *Attorney, Agent, or Firm* — VLP Law Group LLP (57) ABSTRACT

A method and system for determining a position using a rotatable antenna array is provided. The method and system may include receiving first location information at a first stopping point by one or more antenna of a rotatable antenna array, the first stopping point of each of the one or more antenna being different, rotating the one or more antenna from the first stopping point to a second stopping point using the rotatable antenna array, receiving second location information at the second stopping point by the one or more antenna of the rotatable antenna array, the second stopping point of each of the one or more antenna being different, and determining an average location using the first location information and the second location information.

18 Claims, 8 Drawing Sheets

DETERMINING POSITIONS USING ROTATING ANTENNA ARRAY

BACKGROUND

Field of the Invention

The specification generally relates to technology for a positioning system using a rotating antenna array.

Description of the Background Art

Working on construction sites requires measuring out a representation of a blueprint to place every feature at desired locations indicated by the blueprint. Some current methods of laying out construction sites incorporate pulling a fiberglass measuring tape from site foundation structural components of a building that is being built. However, using a fiberglass measuring tape to measure distances and mark out locations for building's structural components is very time consuming, utilize markers that are not persistent (e.g., may be subject to change over time by weather and working conditions), require re-measuring, and require consistency and continual precision. These factors typically lead to measurement error, which results in structural components (e.g., walls, pipes, electrical wires, etc.) being installed in the incorrect locations (different positions than the positions indicated by the blueprint). One current solution to this issue uses electronic positioning systems to help in the measurement and layout process, however these electronic positioning determinations are not accurate enough to be exclusively relied on for blueprint technology.

Therefore, a need exists for blueprint technology that eliminates human error and provides a higher degree of accuracy.

SUMMARY

The techniques introduced herein overcome the deficiencies and limitations of the prior art, at least in part, by providing innovative technology for determining positions using a rotating antenna array.

One general aspect includes a method also including receiving first location information at a first stopping point by one or more antenna of a rotatable antenna array, the first stopping point of each of the one or more antenna being different; rotating the one or more antenna from the first stopping point to a second stopping point using the rotatable antenna array; receiving second location information at the second stopping point by the one or more antenna of the rotatable antenna array, the second stopping point of each of the one or more antenna being different; and determining a device location using the first location information and the second location information.

Implementations may include one or more of the following features. The method where the first stopping point and the second stopping point form a concentric circle about which the rotatable antenna array rotates. The one or more antenna of the rotatable antenna array include a first antenna, a second antenna, and a third antenna. The device location is determined by calculating a center point for each antenna of the one or more antenna using the first location information and the second location information and then determining a cumulative average of the calculated center points. The center point for each antenna is a center position about which each of the antenna of the one or more antenna are rotating. The cumulative average is an average of the center points for each antenna of the one or more antenna that is divided by a total amount of the one or more antenna. The cumulative average represents a pivot point position of the rotating antenna array. The rotating antenna array is mounted on a layout device, the method may include: sending the device location to the layout device; and responsive to the layout device receiving the device location, the layout device projecting a representation of an object on a surface based on the device location. The one or more antenna receive signals via one or more of GPS, ultrawide band, bluetooth, rfid, radio beacon, sonar, radar, and wifi.

One general aspect includes a rotating antenna array that also includes one or more antenna configured to receive signals from a transmitting device, the signals representing location information; a rotating antenna boom configured to retain the one or more antenna on separate arms of the rotating antenna boom, a pivot point attachment that retains the rotating antenna boom and causes the rotating antenna boom to rotate about the pivot point attachment, a motor that actuates a rotation of the rotating antenna boom about the pivot point attachment, and a position engine that determines a device location of the rotating antenna array using the location information from the one or more antenna.

Implementations may include one or more of the following features. The rotating antenna array where the one or more antenna are configured to rotate from a first stopping point to a second stopping point to form a concentric circle about which the rotatable antenna boom rotates. The location information includes first location information and second location information and where the one or more antenna are configured to receive the first location information when in the first stopping position and to receive the second location information when in the second stopping position. The position engine determines the device location by calculating a center point for each antenna of the one or more antenna using the first location information and the second location information and then determining a cumulative average of the calculated center points. The center point for each antenna is a center position about which each of the antenna of the one or more antenna are rotating. The cumulative average is an average of the center points for each antenna of the one or more antenna that is divided by a total amount of the one or more antenna. The cumulative average represents a position of the pivot point attachment of the rotating antenna array. The one or more antenna receive signals via one or more of GPS, ultrawide band, bluetooth, rfid, radio beacon, sonar, radar, and wifi.

One general aspect includes a method that also includes capturing first location information at the first stopping point, the first location information representing first stopping point antenna positions for a first antenna, a second antenna, and a third antenna, the first antenna, the second antenna, and the third antenna being included in a rotatable antenna array; rotating the first antenna, the second antenna, and the third antenna to a second stopping point using the rotatable antenna array; capturing second location information at the second stopping point, the second location information representing second stopping point antenna positions for the first antenna, the second antenna, and the third antenna; determining first stopping point center point positions for the first antenna, the second antenna, and the third antenna at the first stopping point using the first stopping point antenna positions; determining second stopping point center point positions for the first antenna, the second antenna, and the third antenna at the second stopping point using the second stopping point antenna positions; determining cumulative average positions for the first antenna, the second antenna, and the third antenna using the first stopping point center positions and the second stopping point center positions; and determining a device position using the cumulative average positions for the first antenna, the second antenna, and the third antenna.

Implementations may include one or more of the following features. The method where the first stopping point and the second stopping point form a concentric circle about which the first antenna, the second antenna, and the third antenna. The first antenna, the second antenna, and the third antenna receive signals via one or more of GPS, ultrawide band, bluetooth, rfid, radio beacon, sonar, radar, and wifi. Implementations of the described techniques may include hardware, a method or process, or computer software on a computer-accessible medium.

BRIEF DESCRIPTION OF THE DRAWINGS

The techniques introduced herein are illustrated by way of example, and not by way of limitation in the figures of the accompanying drawings in which like reference numerals are used to refer to similar elements.

DETAILED DESCRIPTION

The technology described herein relates to using multiple antenna, where each antenna is receiving information from another source that is then calculated to determine a position of the multiple antenna.

Figure 1A:
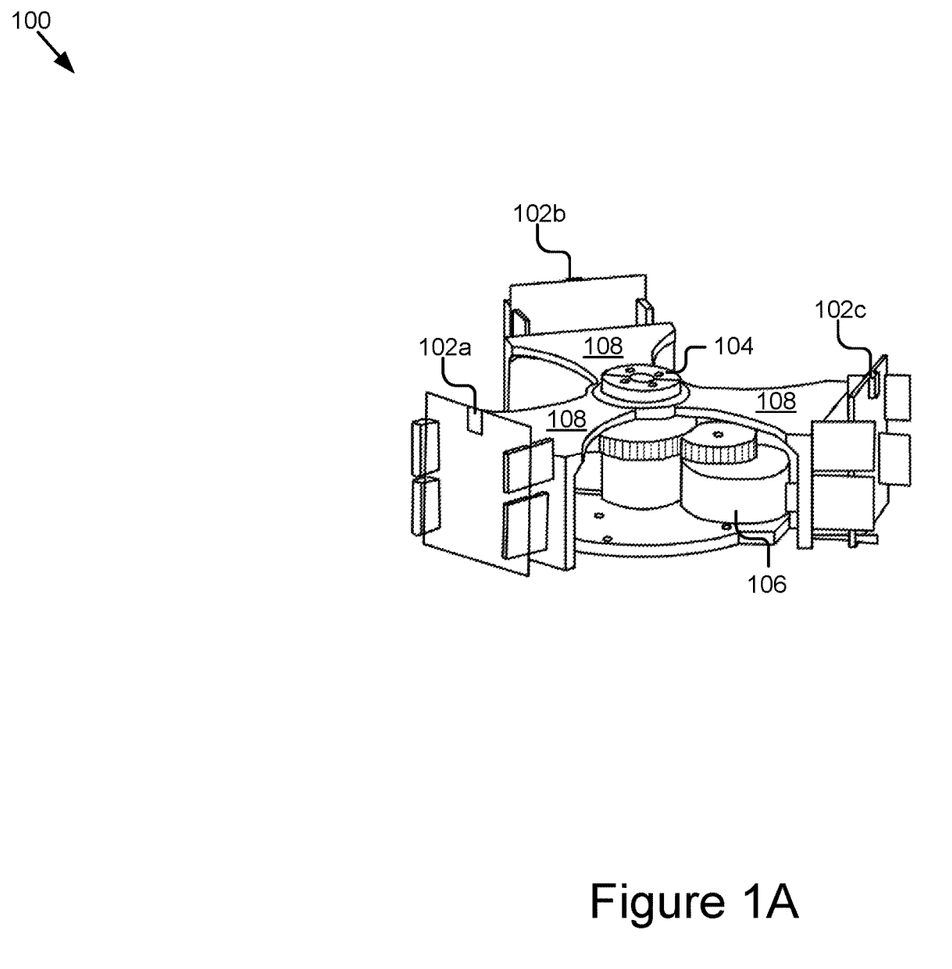
FIGS. 1A-1C shows a graphical representation illustrating an example rotating antenna system.

As shown in FIG. 1, in some implementations, the multiple antenna are configured in a rotating antenna array 100 as described in more detail below. FIG. 1A depicts a perspective view of a rotating antenna array 100. As shown in FIG. 1A, the rotating antenna array 100 may include one or more antennas 102a-102n (shown as 102a, 102b, and 102c in this example). These antenna 102 may be attached to an antenna rotating boom 108 that allows each of the antenna 102 to rotate about a pivot point 104. In some implementations, the pivot point 104 may act as a pivot point attachment to hold or retain the antenna rotating boom 108 and allow the antenna rotating boom 108 to rotate about the pivot point 104. In some implementations, the rotating antenna array 100 may use a motor 106 or other movement device to cause the antenna rotating boom 108 to rotate and stop about the pivot point 104 and cause the antennas 102a-102n to capture positional information as they rotate about the pivot point 104 and stop at various stopping points.

Figure 3:
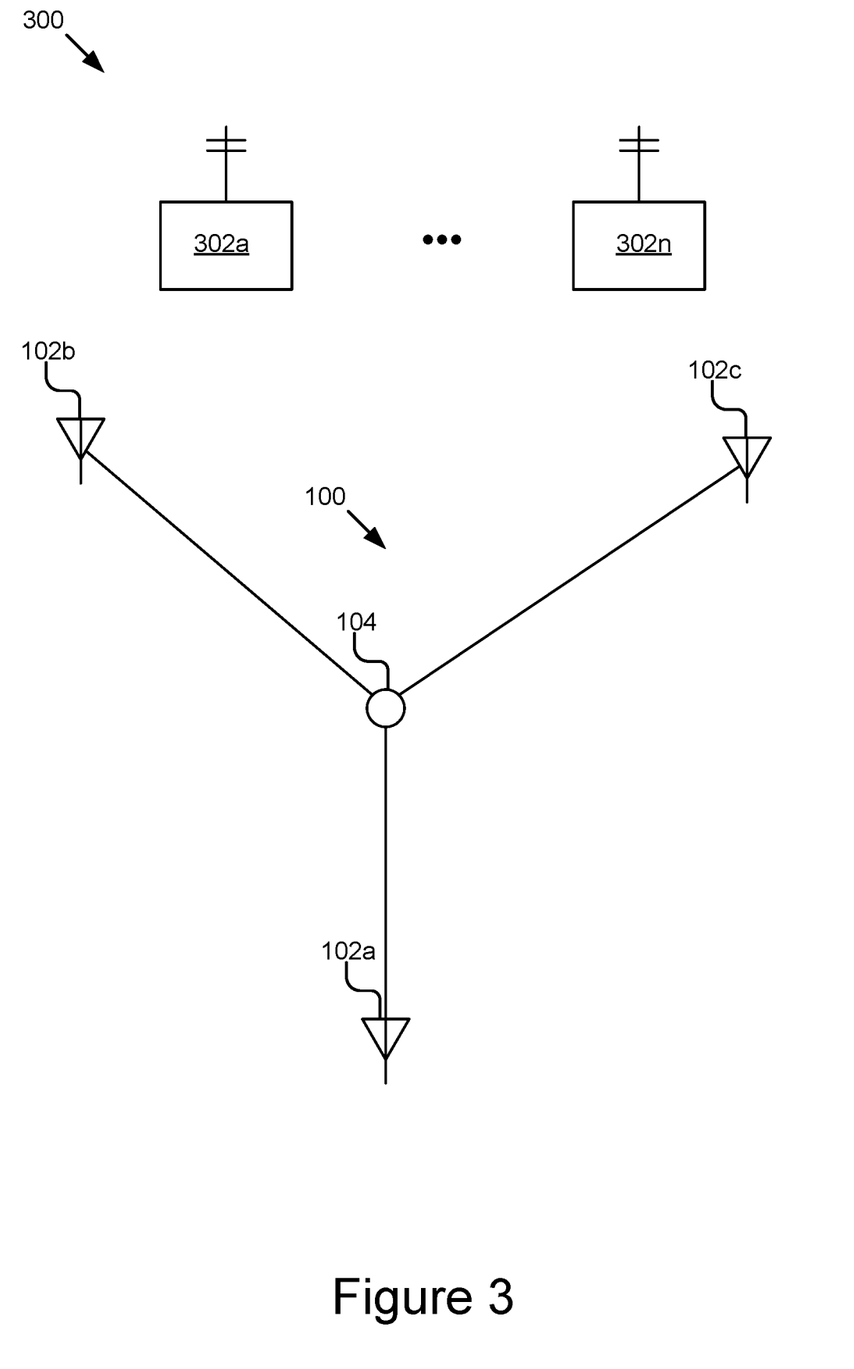
FIG. 3 shows a graphical representation of a rotating antenna system.

In some implementations, as shown with respect to FIG. 3, the antennas 102a-102n may each receive location information from one or more transmitting devices 302a-302n (which may be wi-fi, Bluetooth, ultra wide-band, GPS, etc.) that are placed around a given area and the transmitting devices 302a-302n may each transmit a signal of their location to one or more of the antennas 102a-102n of the rotating antenna array 100. In some implementations, the transmitting devices 302a-302n may have a known location, either they are placed at specific known locations that are then transmitted to the rotating antenna array 100, or in other implementations, the transmitting devices 302a-302n may be able to transmit relative to each other and another known location (not shown) and determine location of the transmitting devices 302a-302n based on the other known location (not shown) that is capable of transmitting to the transmitting devices 302a-302n. In further implementations, the transmitting devices 302a-302n can ping each other and based on the receive location information can calculate relative positions and triangulate locations of one or more of the transmitting devices 302a-302n based on those calculations.

As shown in FIG. 1A, as the antennas 102a-102n are rotated around the pivot point 104, the antennas 102a-102n may receive location information from the one or more transmitting devices 302a-302n. The location information received by the antennas 102a-102n correlate to the respective position of the rotating antenna array 100 as shown with respect to FIG. 4. The location information for the antennas 102a-102n at each of the respective positions for each of the antennas 102a-102n are then used to calculate a determined position of the rotating antenna array 100. By calculating a plurality of location information positions for the antennas 102a-102n the rotating antenna array 100 can provide a more accurate determined position that accounts for various errors that are introduced into position determinations that do not use a rotating antenna array. For example, a position determination using a single antenna is prone to signal interruptions or signal delays that can cause errors to be introduced into the position determination. By capturing a plurality of location information positions using the rotating antenna array 100, the position determination can account for any signal interruptions or signal delays between the one or more antennas 102a-102n and the one or more transmitting devices 302a-302n.

Figure 1B:
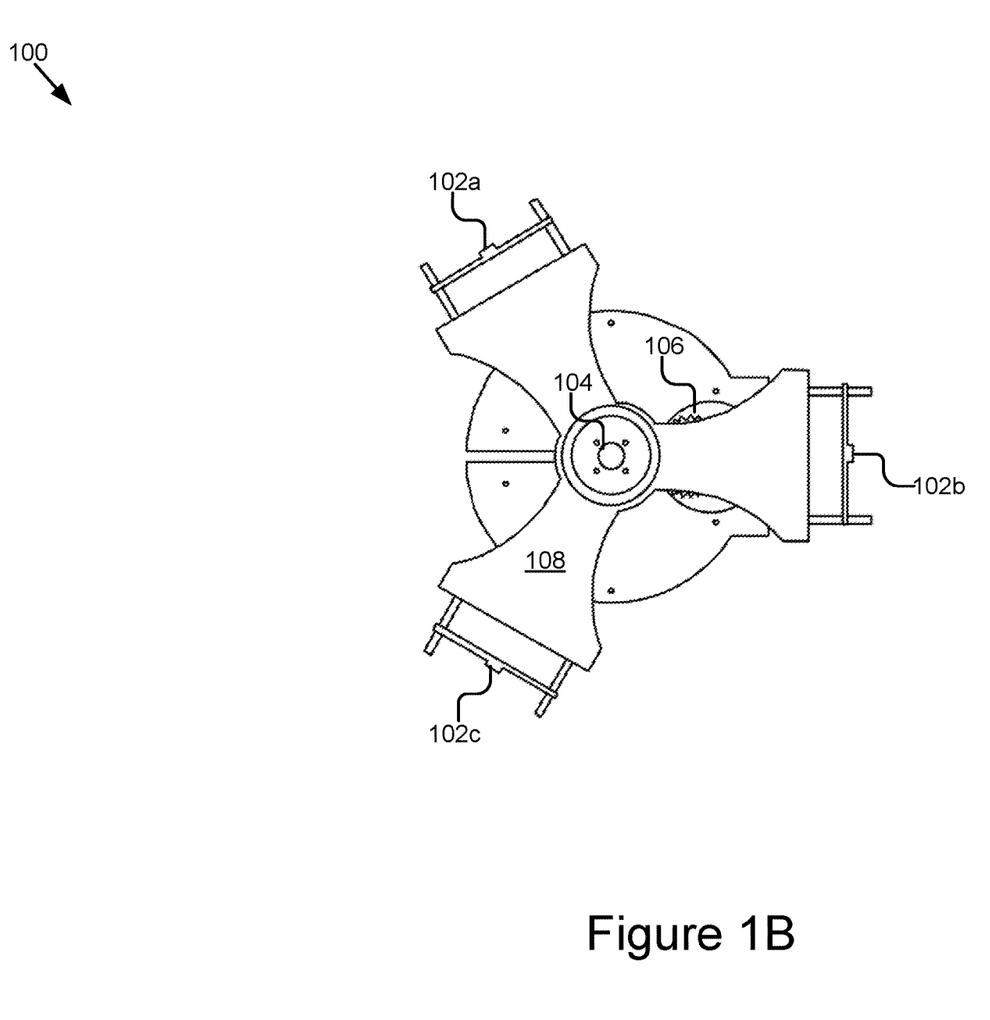
Figure 1C:
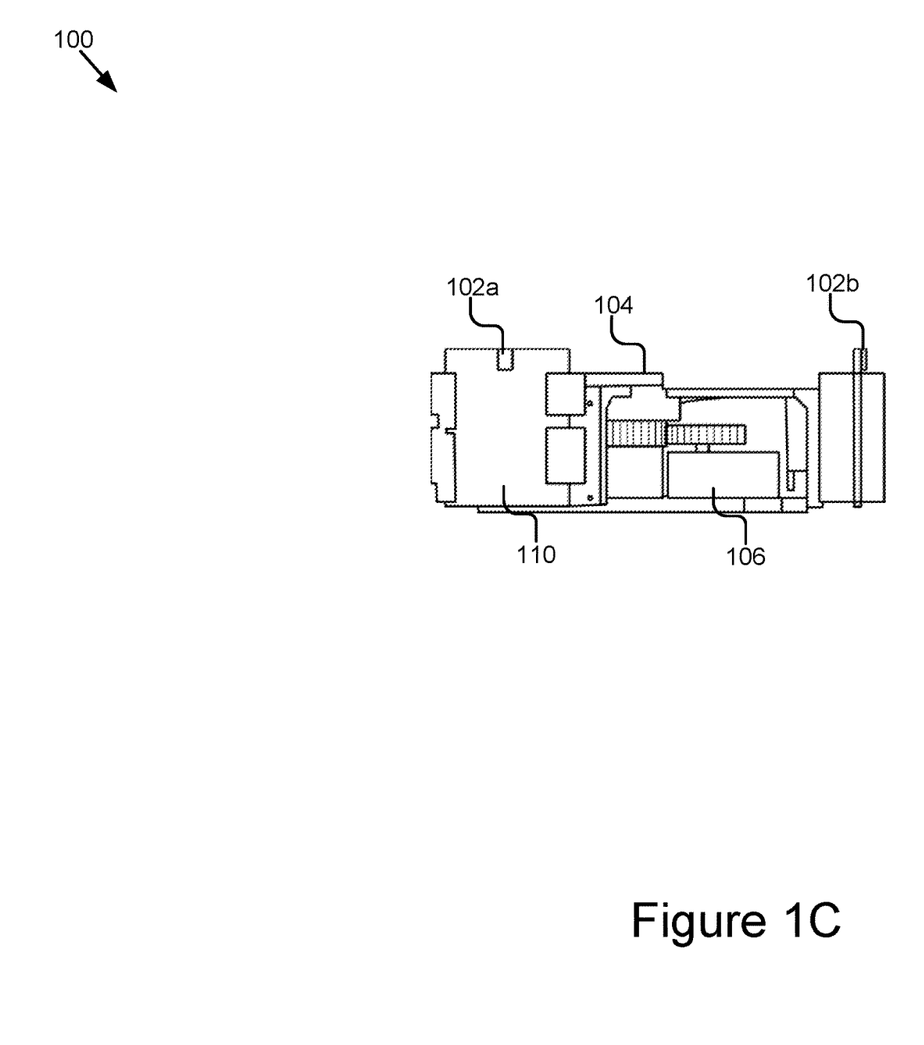

As shown in FIG. 1A, the antenna rotating boom 108 may be configured to rotate about the pivot point 104 and may hold or position one or more antennas 102a-102n. In the example shown in FIG. 1A, the antenna boom 108 includes three different arms that each hold an antenna 102a-102c that are equally spaced about the pivot point 104. It should be understood that any number of antennas 102a-102n may be attached to the antenna rotating boom 108 and those antennas 102a-102n may be equally spaced or may be unequally spaced, such as different lengths of arms of the antenna rotating boom 108 allowing for different extension lengths for the antenna attachments holding the antennas 102. In some implementations, the lengths of the arms of the antenna rotating boom 108 are not limited to the structure shown in FIGS. 1A-IC, but may be extended to any length as needed. Additionally, as the length of the arms of the antenna rotating boom 108 are extended, the capacity for additional accuracy of the determined position using the rotating antenna array 100 is increased. In some implementations, the antenna rotating boom 108 may rotate about a single axis on a two-dimensional plane for capturing location information, while in further implementations, the antenna rotating boom 108 may allow for rotations about the pivot point 104 in three dimensions to capture a three-dimensional spread of location information for additional positional determinations.

As shown in FIG. 1A, the rotating antenna array 100 may use a motor 106 to cause the antenna rotating boom 108 to rotate about the pivot point 104. In some implementations, the motor 106 may allow for a variability of speed and the speed of the motor 106 can be varied as needed to capture location information for position determinations. In some implementations, the motor 106 can be configured to cause the rotating antenna array 100 to rotate at a consistent speed and the antennas 102 may sample various location information periodically as the rotating antenna array 100 moves. In further implementations, the motor 106 can alternate or change the speeds and a position engine 216 can use the motor 106 speed at time of sampling to calculate positions of the antenna 102. In further implementations, the antenna 102 can sample after the motor 106 moves through various stopping points 402 as shown with respect to FIG. 4.

In some implementations, the motor 106 may connect to a portable power supply such as batteries or a portable power source to allow for easy movement and positioning of the rotating antenna array 100. In some implementations, as shown in FIG. 1A, the gears that are rotated by the motor 106 may be exposed, while in further implementations, the motor 106 and other components may be enclosed within a housing (not shown) that protects the various components of the rotating antenna array 100. In further implementations, other movement devices may be used to cause the antenna rotating boom 108 to rotate about the pivot point 104, such as magnets or other movement devices. In some implementations, the rotating antenna array 100 may be configured to be mounted on other devices to determine a specific position of the other device. For example, in one implementation, the rotating antenna array 100 may be mounted on a layout projection device 502 as shown with respect to FIG. 5. The specific position of the layout projection device 502 may then be determined using the rotating antenna array 100 and the layout projection device 502 may use the determined location during the operation of the layout projection device 502.

FIG. 1B shows a top-down view of the rotating antenna array 100. As shown in FIG. 1B, the antennas 102a-102c may be mounted on the ends of the antenna rotating boom 108 and allow for either clockwise and/or counterclockwise rotation about the pivot point 104. As shown in the example in FIG. 1B, the antennas 102 may be mounted using various mounting components to the ends of the antenna rotating boom 108. In some implementations, the rotating antenna array 100 may be configured to easily attach various antenna 102 to the ends of the antenna rotating boom 108 for easy setup and/or installation of the rotating antenna array 100. FIG. 1C shows a side view of the rotating antenna array 100. As shown in FIG. 1C, the antennas 102 may include the antenna receiver at a top of the antenna mounting apparatus 110 and additional components needed for the antenna 102 operation may be included on the antenna mounting apparatus 110.

In FIGS. 1A-1C and the remaining figures, a letter after a reference number, e.g., "102a," represents a reference to the element having that particular reference number. A reference number in the text without a following letter, e.g., "102," represents a general reference to instances of the element bearing that reference number.

The rotating antenna array 100 may include one or more electronic information sources (not shown) that can be accessed by other devices. The information source(s) may be local and/or remote, and include one or more non-transitory computer-readable media, for storing, retrieving, updating, deleting, and/or otherwise manipulating data, such as blueprint documents, positional data, user settings, premises-related settings, etc. The rotating antenna array 100 may be communicatively coupled to the electronic information source via a communications bus, a computer network (e.g., wired and/or wireless network connection and corresponding interfaces, etc., (not shown)).

In some embodiments, an electronic information source may be a computing device that includes a memory and a processor, for example a server, a laptop computer, a desktop computer, a tablet computer, a mobile telephone, a smartphone, a personal digital assistant (PDA), a mobile email device, a webcam, a user wearable computing device, or any other electronic device capable of accessing a network. The electronic information source may, in some cases, provide general graphics and multimedia processing for any type of application. In some embodiments, the electronic information source may include a display for viewing and/or inputting information on an application, such as blueprint documents, positional data, user settings, premises-related settings, etc.

A computer network can be a conventional type, wired or wireless, and may have numerous different configurations including a star configuration, token ring configuration or other configurations. Furthermore, the network may include a local area network (LAN), a wide area network (WAN) (e.g., the Internet), and/or other interconnected data paths across which multiple devices may communicate. In some embodiments, the network may be a peer-to-peer network. The network may also be coupled to or include portions of a telecommunications network for sending data in a variety of different communication protocols. In some embodiments, the network may include Bluetooth communication networks or a cellular communications network for sending and receiving data including via short messaging service (SMS), multimedia messaging service (MMS), hypertext transfer protocol (HTTP), direct data connection, push notifications, WAP, email, etc.

Figure 2:
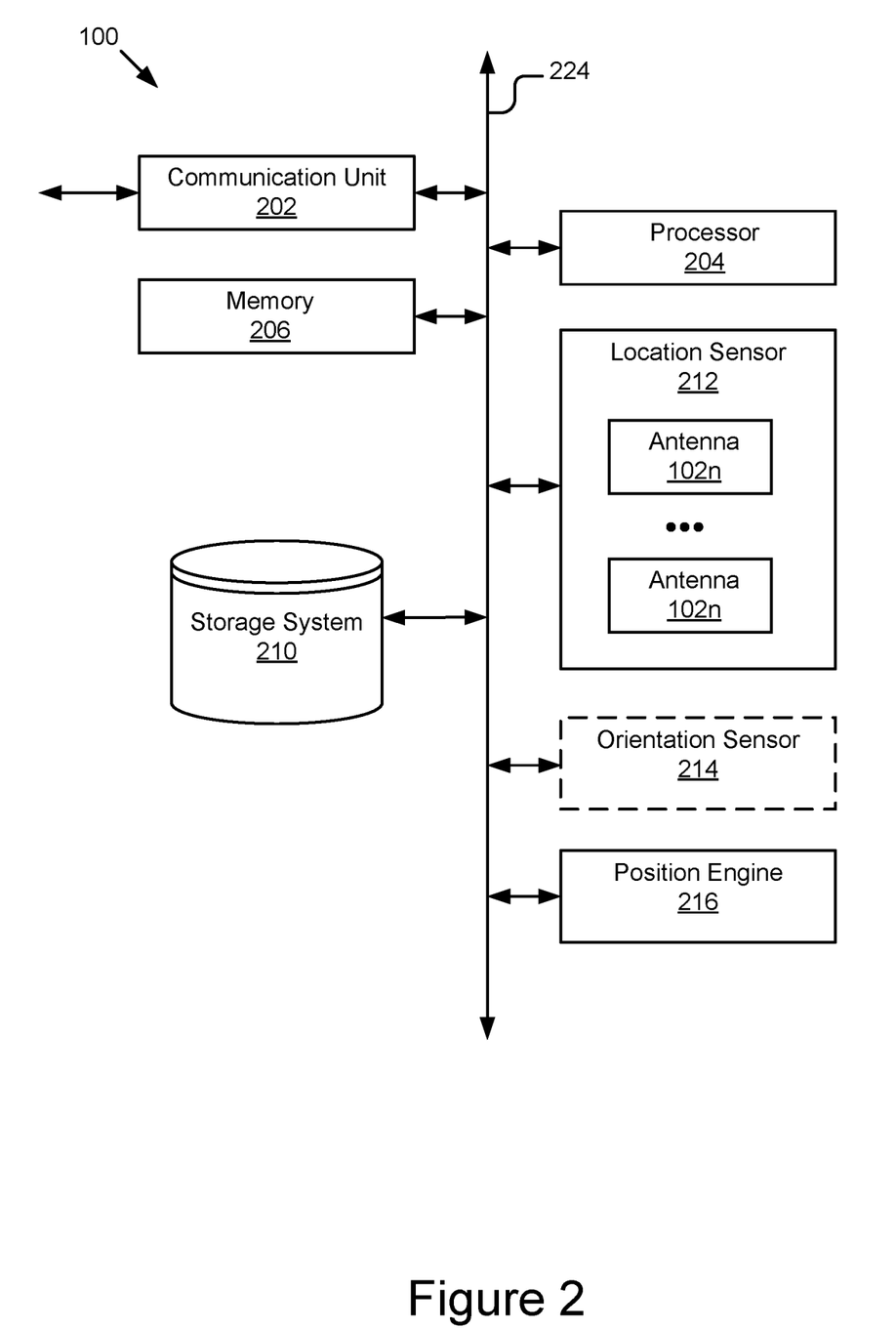
FIG. 2 shows a block diagram illustrating an example rotating antenna system and layout device.

FIG. 2 illustrates a block diagram illustrating an example rotating antenna array 100. The example rotating antenna array 100 may include a communication unit 202, a processor 204, a memory 206, a storage system 210, a location sensor 212, an orientation sensor 214, and/or a position engine 216 according to some examples. The components of the rotating antenna array 100 may be configured to capture location information and determine a position of the rotating antenna array 100, as discussed elsewhere herein. The components of the rotating antenna array 100 are communicatively coupled by a bus and/or software communication mechanism 224, which may represent an industry standard architecture (ISA), a peripheral component interconnect (PCI) bus, a universal serial bus (USB), or some other suitable architecture.

The processor 204 may execute software instructions by performing various input/output, logical, and/or mathematical operations. The processor 204 may have various computing architectures to process data signals including, for example, a complex instruction set computer (CISC) architecture, a reduced instruction set computer (RISC) architecture, and/or an architecture implementing a combination of instruction sets. The processor 204 may be physical and/or virtual, and may include a single processing unit or a plurality of processing units and/or cores.

In some embodiments, the processor 204 may be coupled to the memory 206 via the bus and/or software communication mechanism 224 to access data and instructions therefrom and store data therein. The bus and/or software communication mechanism 224 may couple the processor 204 to the other components of the computing device 200 including, for example, the memory 206, the communication unit 202, the position engine 216, and the storage system 210. It should be understood that other processors, operating systems, sensors, displays and physical configurations are also possible.

The memory 206 may store and provide access to data for the other components of the rotating antenna array 100. The memory 206 may be included in a single computing device or may be distributed among a plurality of computing devices as discussed elsewhere herein. In some embodiments, the memory 206 may store instructions and/or data that may be executed by the processor 204. The instructions and/or data may include code for performing the techniques described herein. For example, in one embodiment, the memory 206 may store position engine 216. The memory 206 is also capable of storing other instructions and data, including, for example, an operating system, hardware drivers, other software applications, databases, etc. The memory 206 may be coupled to the bus or software communication mechanism 224 for communication with the processor 204 and the other components of the layout device 502.

The memory 206 may include one or more non-transitory computer-usable (e.g., readable, writeable) devices, a static random access memory (SRAM) device, an embedded memory device, a discrete memory device (e.g., a PROM, FPROM, ROM), a hard disk drive, an optical disk drive (CD, DVD, Blu-ray™, etc.), which can be any tangible apparatus or device that can contain, store, communicate, or transport instructions, data, computer programs, software, code, routines, etc., for processing by or in connection with the processor 204. In some embodiments, the memory 206 may include one or more of volatile memory and non-volatile memory. It should be understood that the memory 206 may be a single device or may include multiple types of devices and configurations.

The communication unit 202 is hardware for receiving and transmitting data by linking the processor 204 to the network and other processing systems. The communication unit 202 may receive data, such as blueprint documents or other electronic information, from other electronic information source(s), and may provide the data and/or determined positions to the other components of the rotating antenna array 100, for processing and/or storage. In some embodiments, the communication unit 202 may transmits data (e.g., positional data, settings, premises-related information, etc.) to other electronic information source(s) for processing and/or display. The communication unit 202 may include one or more wired and/or wireless interfaces. The communication unit 202 may provide standard connections to the network for distribution of files and/or media objects using standard network protocols, such as TCP/IP, HTTP, HTTPS and SMTP.

In some embodiments, the communication unit 202 may include a port for direct physical connection to a client device (not shown) or to another communication channel. For example, the communication unit 202 may include an RJ45 port or similar port for wired communication with an electronic information source. In some embodiments, the communication unit 202 may include a wireless transceiver (not shown) for exchanging data with the electronic information source or any other communication channel using one or more wireless communication methods, such as IEEE 802.11, IEEE 802.16, Bluetooth® or another suitable wireless communication method. In some embodiments, the communication unit 202 may include a cellular communications transceiver for sending and receiving data over a cellular communications network such as via short messaging service (SMS), multimedia messaging service (MMS), hypertext transfer protocol (HTTP), direct data connection, push notification, WAP, e-mail or another suitable type of electronic communication. Other suitable variations for communicating data are also possible and contemplated.

The storage system 210 is an electronic information source that includes a non-transitory memory that stores data, such as the data discussed elsewhere herein. The storage system 210 may be local and/or remote. The storage system 210 may be a dynamic random access memory (DRAM) device, a static random access memory (SRAM) device, flash memory or some other memory device. In some embodiments, the storage system 210 also may include a non-volatile memory or similar permanent storage device and media including a hard disk drive, a solid state drive, a floppy disk drive, or some other mass storage device for storing information on a more permanent basis. In the illustrated embodiment, the storage system 210 is communicatively coupled to the bus or software communication mechanism 224.

The location sensor 212 may include one or more sensors that capture attribute(s) of an external environment of the layout device 502 and determine a physical location of the rotating antenna array 100 based on the attribute(s). The location sensor 212 may include hardware and/or software capable of determining the physical location. The location sensor 212 may be configured to provide the location data and/or physical location to the rotating antenna array 100, and/or may store the data for access and/or retrieval thereby. In some implementations, the location sensors 212 may include the one or more antenna 102a-102n as described elsewhere herein. The one or more antenna 102a-102n may be configured to receive and/or transmit various signals to other transmitting devices 302 and may be able to determine lengths of time for the various signals, signal strengths, directionality, etc. of the various signals being transmitted and/or received between the antennas 102a-102n and the transmitting devices 302.

In some embodiments, the location sensor 212 may include one or more sensors such as a Global Positioning System (GPS) sensor, Global Navigational Satellite System (GLONASS) sensor, Galileo system sensor, a BeiDou sensor, an IRNSS sensor, a QZSS sensor, a LIDAR sensor, an ultra-wideband sensor, a radio-positioning sensor, and/or a Real Time Location System (RTLS) sensor. An RTLS sensor may be a used to automatically identify and track the locations of objects/people in real time. An RTLS may use active RFID, active RFID-IR, optical locating, infrared, low-frequency signpost identification, semi-active RFID, passive RFID RTLS locating via steerable phased array antennae, radio beacons, ultrasound identification, ultrasonic ranging, wide-over-narrow band, wireless local area network, Bluetooth, clustering in noisy ambience, and/or bivalent systems to track the locations.

In some embodiments, the location sensor 212 may be embodied by the communication unit 202, and positional data may be determined by triangulating position between radio communication nodes (e.g., other wireless transceivers, triangulation data determined by a third-party (e.g., wireless carrier), etc. Any other suitable variations for determining location are also possible and contemplated. In some embodiments, the location sensor 212 may be configured to collect location data based upon a request to collect location data. In further embodiments, the location sensor 212 may collect location data continuously or at regular intervals. In some embodiments, the rotating antenna array 100 may determine a physical location of the layout device 502 to within a precise threshold, such as 3/16 of an inch, in order to provide precise accuracy of the layout device 502 and the projection.

The orientation sensor 214 may include one or more sensors that collect orientation data and determine an orientation (e.g., pitch, azimuth, yaw, roll, etc.) of the rotating antenna array 100. The orientation sensor 214 may be hardware and/or software capable of determining the orientation of the rotating antenna array 100. The orientation sensors 214 may be configured to provide the orientation data to the rotating antenna array 100 and/or the position engine 216. In some embodiments, the orientation sensor 214 may include one or more accelerometers, gyroscopes, or other devices capable of detecting orientation. In some embodiments, the orientation sensor 214 may be configured to determine yaw, azimuth, pitch, and/or roll. In some embodiments, the orientation sensor 214 may be configured to collect orientation data based upon a request to collect orientation data. In further embodiments, the orientation sensor 214 may collect orientation data continuously or at regular intervals. In some embodiments, the orientation sensor 214 may determine the orientation of the rotating antenna array 100 to be situated within a precise threshold, such as within 0.1, 0.5, 1, 1.5, and/or 2+ degrees of accuracy, in order to provide precise accuracy of the rotating antenna array 100 for the determined positions.

The position engine 216 may include computer logic to provide the functionality for determining a position of the rotating antenna array 100 using the collected location information from the one or more antennas 102a-102n of the rotating antenna array 100 and provide the determined position to other devices. The computer logic may be implemented in software, hardware, and/or a combination of the foregoing. The position engine 216 may be configured to receive a plurality of location information that may include exact positions of each antenna 102 on the antenna rotating boom 108, a speed of rotation, a received signal from a transmitting device for each of the antenna 102 at specific time intervals and/or position stops. The position engine 216 may then be configured to use the location information to calculate a specific determined position of the rotating antenna array 100.

FIG. 3 shows a system 300 with an example rotating antenna array 100 and example transmitting devices 302a-302n. As shown, the transmitting devices 302a-302n may be dispersed throughout an area and may transmit and/or receive signals to and/or from the antennas 102a-102n. As the rotating antenna array 100 rotates the antenna 102 to different positions around the pivot point 104, the antenna 102 receive position information associated with the signals for the transmitting devices 302a-302n.

In some implementations, the accuracy of the location determinations using the rotating antenna array 100 can be up to 1 mm of accuracy. In some implementations, anything that might interrupt a transmitting signal from the transmitting device 302, such as interference of the signal, may create errors in the accuracy. The rotating antenna array 100 described herein can account for those errors in accuracy, where if strange data or a deviation that is unexpected is received from one of the transmitting devices 302, that data from that transmitting device 302 (or beacon) can be ignored and other data from the other transmitting devices 302 is used instead. In some implementations, the number of transmitting devices 302a-302n is sufficient that if data errors are received from one or more transmitting devices 302, the remaining transmitting devices 302a-302n will be sufficient to continue providing accurate location data and/or location information. The potential data errors can be ignored in some implementations where that data is dropped. In further implementations, machine learning algorithms can be used to predict what the data error is and account for what the location data should be based on various inputs, such as historical location data, the other transmitting devices 302 relative to the transmitting devices 302 providing errors, etc. The machine learning algorithms can detect when data is potentially coming in with errors and account for these errors when doing the location determinations.

In some implementations, the antennas 102 are spaced along a circular trajectory at a predetermined distance that may be but are not necessarily equal distance and rotate about the center of that circular trajectory along the pivot point 104. In some implementations, the further apart the rotating antenna 102 are, the more accurate the location determination may be. Based on design constraints for various uses, different antenna distances are contemplated. For example, in a portable use case, the rotating antenna array 100 may be designed to fit within a cover/case and be anywhere from 10-15 cm apart based on cover/case design. In some implementations, where the desire is to improve a GPS/Radar/Sonar system, the rotating antenna adds in a three-dimensional picture. For example, in this implementation, the rotating antenna array could be installed in a mast on a ship and the antenna array could be much larger distances apart, such as 30 feet wide, etc.

Figure 4:
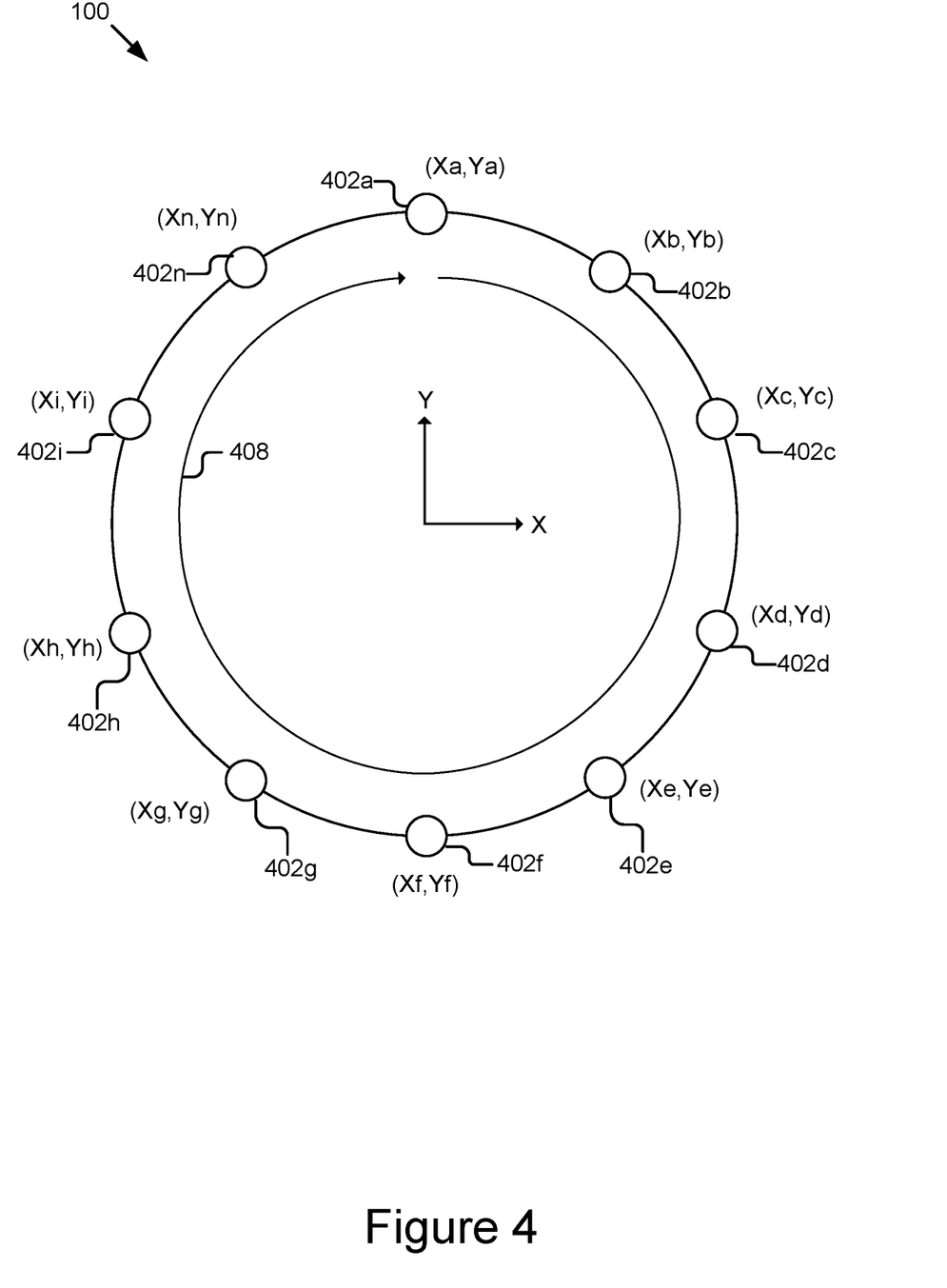
FIG. 4 shows a graphical representation of measurement positions of a rotating antenna system.

FIG. 4 depicts a graphical representation of a top-down view of a rotating antenna array 100 with various stopping positions 402 forming a concentric circle along a single plane. As shown in FIG. 4, the rotating antenna array 100 rotates in a clockwise fashion and stops at various stopping points 402 allowing each of the antennas 102 to capture location data at the stopping point. In an example with three rotating antennas 102a-102c, at a first stopping point, a first antenna 102a may capture location information at stopping positions 402a while simultaneously a second antenna 102b may capture location information at stopping point 402d and a third antenna 102c may capture location information at stopping point 402h. Using the stopping point antenna positions, each of the antennas 102 can capture separate location information represented as each of the antennas 102 stopping point antenna positions that can be used to calculate a stopping point center position at each of the stopping points 402. The rotating antenna array 100 may then rotate the antennas to a second stopping position and the antennas 120a-102c may simultaneously capture location information at the new respective stopping points. The results of these stopping points in the rotation creates location data captured at specific stopping points at specific times then rotated to new stopping points capturing location data at new times. In some implementations, all stopping positions are an equal distance from each other along the circular trajectory of the antenna 102 or receiver and the number of positions is a divisor of the circular trajectory while in further implementations, the stopping points may be unequal distances and captured at different intervals.

The position engine 216 may then compute the $x_o$ position at the center of a single antenna 102 given the $x_n$ measurements at each stop/measurement point with m being the total number of measurement points as shown below:

$$\frac{\sum_{n=1}^{m} x_n}{m} = x_0$$

The number of increments is a divisor into the whole of the circle. The position engine 216 then repeats the calculation process for each of the antennas 102 to be determined. The solution yields the position of the center point. In some implementations, the center position represent a center point.

To further increase the accuracy of the position of the center pivot point the calculations are repeated for each component of each antenna/receiver to give an average of the collective result. The technology for measuring position using the given antennas can be but is not limited to GPS, Ultrawide Band, Bluetooth, RFID, Radio Beacon, Sonar, Radar, or WiFi. In other implementations, the antenna 102 can receive signals from ultrasonic or other acoustic transmitters.

The position engine 216 may then compute a cumulative average $x_o$ position (determined position) for three antenna 102a-012c represented by $A_{nx}$ in a rotating antenna array 100 having m measurement points shown below and divided by the amount of antenna (3 in this example):

$$\frac{\frac{\sum_{n=1}^{m}A_{1x}}{m}+\frac{\sum_{n=1}^{m}A_{2x}}{m}+\frac{\sum_{n=1}^{m}A_{3x}}{m}}{3}=x_0$$

The position engine 216 may then use the cumulative average position to identify a determined position, such as a determined position of the device, e.g., a device position. In further implementations, based on where the rotating antenna array 100 is attached to another device, the position engine 216 can calculate the position of the other device (e.g., another device position) by extrapolating based on the mounting data from the determined position.

Figure 5:
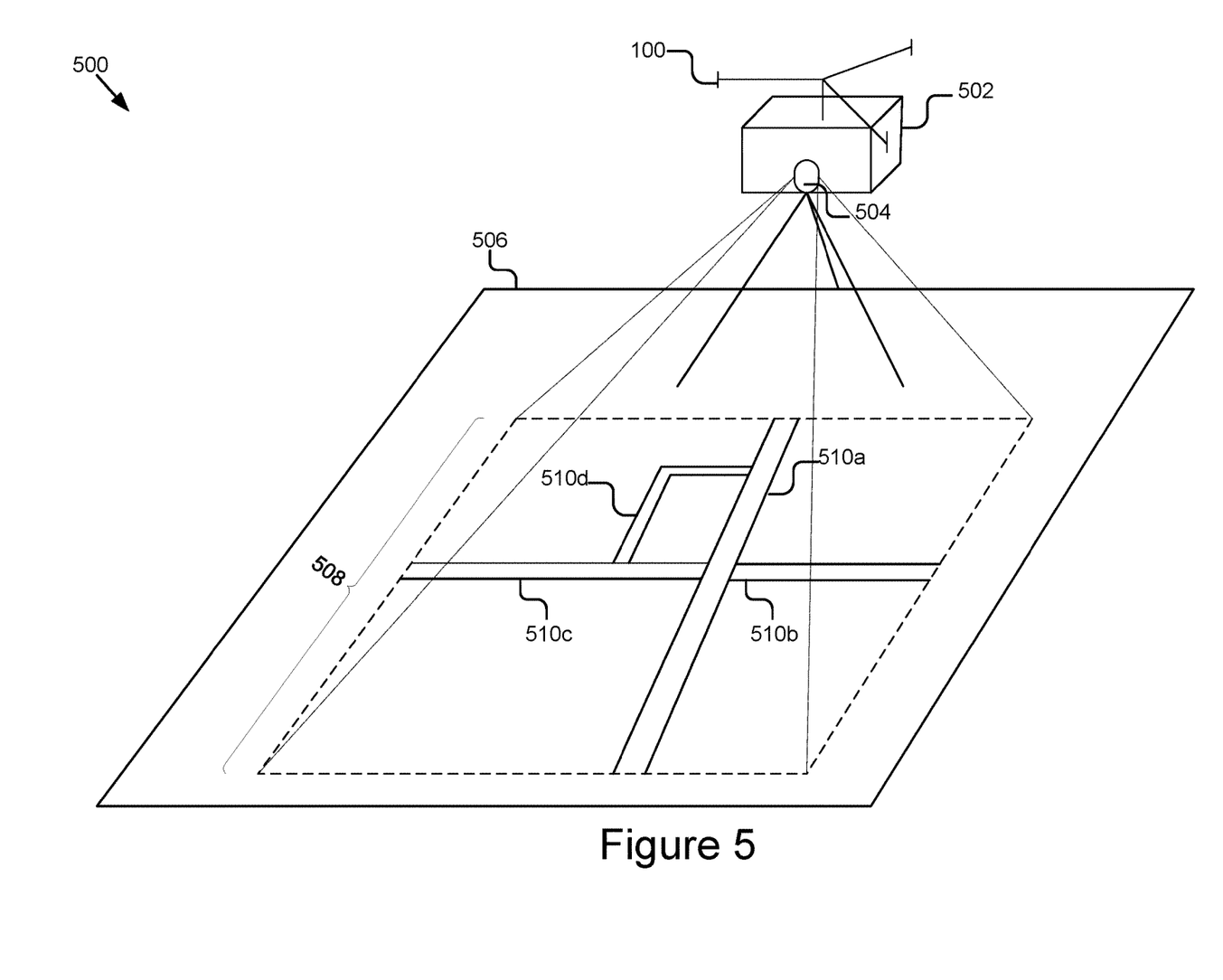
FIG. 5 shows a graphical representation of rotating antenna system and a layout projecting system.

FIG. 5 shows a graphical representation of an example system 100 including a layout device 502 projecting a layout 508 using the positional information from the rotating antenna array 100. As shown, the layout device 502 may receive the determined rotating antenna array position and may use that location to accurately project a layout 508. The layout device 502 may also include a projector 504 capable of projecting a representation of the layout 508. In some embodiments, the projector 504 may be made up of one or more mirrors and one or more emitters, as discussed in further detail below.

As depicted, the layout device 502 is arranged to project the representation of a layout 508 on a physical surface 506. The physical surface 506 may be any suitable surface of a premise. For example, the physical surface 506 may be a floor, wall, ceiling, etc., of a work site. In some embodiments, the representation of the layout 508 may be projected within a projection area. The projection area may be based on an area of a blueprint, and the layout device 502 may project the representation of the layout 508 within the projection area on the physical surface 506.

In some embodiments, the representation of the layout 508 may include one or more objects from a blueprint or other design document (referred to simply as blueprint). In some embodiments, the blueprint is an electronic document that describes the building specifications for the premises, and includes pictorial and textual information of the elements comprising the premises, such as wall locations, pipe locations, electrical conduit locations, footing locations, appliance locations, walkways, landscaping elements, etc., for the indoor and/or outdoor area(s) of the premises, such as the various floors, yards, lots, etc., of the premises. The projected objects may include any of these elements included in the blueprint.

In a non-limiting example, the layout device 502 may be used on a construction site of a building. A worker may upload a blueprint to the layout device 502 and the layout device 502 may be positioned above a portion of the work site that will be measured based on the layout included within the blueprint. In some embodiments, a worker may use an application executed on a computer, such as a mobile device, to configure the projection. For instance, inputs are provided via the application specifying the blueprint, configure the projection area of the layout device 502, etc.

Continuing this example, the layout device 502 may receive positional information from the rotatable antenna array 100, which in some implementations may be mounted on the layout device 502 and using the determined location, the layout device 502 may identify a portion of the blueprint that corresponds to the physical location of the layout device 502 and identify objects represented in the blueprint in relation to the physical location of the layout device 502.

Using the positional information from the rotatable antenna array 100, the layout device 502 may also calculate positions for the mirrors of the projector of the layout device 502 in order to project a representation of the layout 508 on the physical surface 506. When determining the positions of the mirrors, the layout device 502 may, in some cases, also make any orientational adjustments, such adjustments to address skewing, key stoning, etc., of the projection. This allows for the workers on site to quickly setup the layout device 502 without having to manually position and level the layout device 502 before projecting the representation of the layout 508, which advantageously increases accuracy and speed while reducing error. Further, the projected layout 508 on the physical surface 506 can provide significantly more detail and resolution for the components to be built than existing solutions (e.g., pencil markings, chalk markings, spray paint, etc.), and allows the workers to visualize the layout, accurately place, and build structural components depicted in the representation of the layout 508, etc.

In a further example, a worker can conveniently and quickly move the layout device 502 to different locations on the premises, and the layout device 502 may automatically determine the different locations using the rotatable antenna array 100 and automatically provide the layouts related to the different locations. In some embodiments, the layout device 502 may include and/or be connected to a moveable device, such as a robot or drone, and the layout device 502 may be configured to automatically, or based on instruction, move to various locations within the premises. For instance, the layout device 502 may be configured to follow a worker or follow a predetermined route to project a layout 508 as the layout device 502 moves.

In some embodiments, the layout device 502 may provide representations of the layout 508 using certain visually distinguishable indicators, such as different colors, shapes, line-widths and/or types, etc., to differentiate different components from one another, such as walls from footings, etc. In further embodiments, the layout device 502 may be programmed to include visual representations (lines, arrows, measurements, etc.) of dimensions for the components in the layout 508 representation that it projects. For instances, dimensions of walls, walkways, appliances, and other objects may be determined from the blueprint and projected for visualization by the workers.

Figure 6:
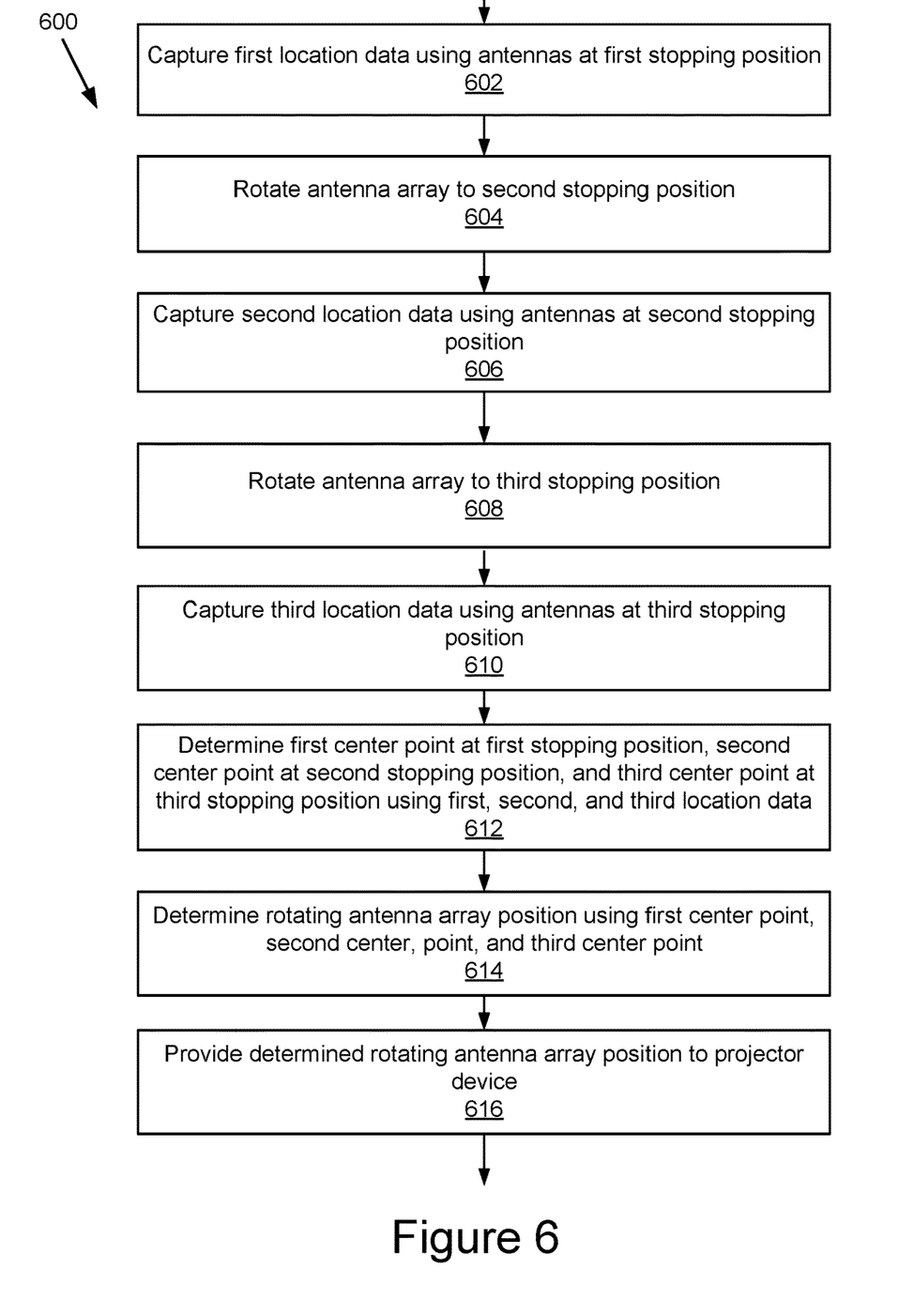
FIG. 6 shows a flow diagram illustrating an example method for positioning determination using a rotating antenna system.

FIG. 6 is a flow chart 600 of a method of determining a position of a rotating antenna array 100. At 602, the rotating antenna array 100 is arranged at a first stopping position 402 with antenna 102. The antenna 102 capture first location data at the first stopping position 402a from the transmitting devices 302. The first location data may be used to determine the respective locations of each of the antenna 102 at the first stopping position 402a. At 604, the rotating antenna array 100 may then cause the motor 106 to move the antenna 102 to the second stopping position 402b. The second stopping position 402b may be a predetermined by the position engine 216 and the position engine 216 may send signals causing the motor actuators to move the rotatable antenna boom 108 to the second stopping position 402b. At 606, the antenna 102 may capture second location data at the second stopping position 402b from the transmitting devices 302. The second location data may be used to determine the respective locations of each of the antenna 102 at the second stopping position 402b. At 608, the rotating antenna array 100 may then cause the motor 106 to move the antenna 102 to the third stopping position 402c. The third stopping position 402c may be a predetermined by the position engine 216 and the position engine 216 may send signals causing the motor actuators to move the rotatable antenna boom 108 to the third stopping position 402c. At 610, the antenna 102 may capture third location data at the third stopping position 402c from the transmitting devices 302. The third location data may be used to determine the respective locations of each of the antenna 102 at the third stopping position 402c. It should be understood that any number of stopping positions 402 may be employed by the location engine 216 and that the rotating antenna array 100 is not limited to a specific number of stopping positions 402, antenna 102, or transmitting devices 302.

At 612, the location engine 216 may determine a first center point at the first stopping position 402a, a second center point at the second stopping position 402b, and a third center point at the third stopping position 402c using the first location data, the second location data, and the third location data respectively. In some implementation, the location engine 216 may analyze the first, second, and third location data to identify any errors or anomalies in the location data to ignore. The location engine 216 may use various machine learning algorithms to identify information that does not fall within expected location data and ignore those anomalies as errors. The location engine 216 may calculate the various center points as described elsewhere herein. At 614, the location engine 216 may then determine a rotating antenna array position using the determined first center point, second center point, and third center point as described elsewhere herein. It should be understood that the first center point, the second center point, and the third center point are merely used as examples and any number of center points can be calculated based on the collected location information. At 616, the location engine 216 may then provide the determined rotating antenna array position to another device for additional use.

In some embodiments, the technology described herein may be used for alternative solutions that incorporate projecting a layout. For example, the layout device 502 may be used for hanging pictures on a wall. A user may take a picture of the back of a picture frame and upload the picture to the layout device 502 and the layout device 502 may project on the wall the location of the picture frame as well as where the holes for hanging the picture should be located based on the back of the picture frame image.

In further examples, the layout device 502 may be used to project the location of can lights or other hardware used in construction of buildings. Specifically, the layout device 502 may project the location of the light or other hardware, as well as projecting where mounting components should be placed. In further embodiments related to construction, the layout device 502 may be used to project a leveling of a surface. The layout device 502 may highlight or otherwise indicate areas that are not proper grade or height and track in real time the grading of the area, as well as providing indications of the level of a projectable area in real time.

In further embodiments, the layout device 502 may be used to project routes, such as infrared routes. A route could be determined and uploaded to the layout device 502 and the layout device 502 may project the route onto a projectable surface. In further embodiments, the layout device 502 may be configured to follow the route and update the projected route as the layout device 502 moves along the route.

In further embodiments, the layout device 502 may be used to project a key or token of a specific layout to unlock a location. For example, a special image specific to a function could be projected to a receiver to unlock a door. In further embodiments, the projection could be projected to an object in motion and the receiver located on the object in motion may be configured to detect the special image projected by the layout device 502.

In further embodiments, the layout device 502 may be used as a visual inspection tool for manufacturing purposes by a human operator or a smart vision camera. The layout device 502 may project a predefined representation and the products being analyzed may be examined in comparison to the representation to determine if the products meet quality control criteria.

Technology for determining a position using a rotating antenna array 100 has been described. In the above description, for purposes of explanation, numerous specific details are set forth in order to provide a thorough understanding of the techniques introduced above. It will be apparent, however, to one skilled in the art that the techniques can be practiced without these specific details. In other instances, structures and devices are shown in block diagram form in order to avoid obscuring the description and for ease of understanding. For example, the techniques are described in one embodiment above primarily with reference to software and particular hardware. However, the present invention applies to any type of computing system that can receive data and commands, and present information as part of any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions described above are presented in terms of algorithms and symbolic representations of operations on data bits within a computer memory. These algorithmic descriptions and representations are, in some circumstances, used by those skilled in the data processing arts to convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "calculating", "determining", "displaying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus or software communication mechanism.

Some embodiments can take the form of an entirely hardware embodiment, an entirely software embodiment or an embodiment containing both hardware and software elements. One embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code can include at least one processor coupled directly or indirectly to memory elements through a system bus or software communication mechanism. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the techniques are not described with reference to any particular programming language. It will be appreciated that a variety of programming languages may be used to implement the teachings of the various embodiments as described herein.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method comprising:
receiving first location information at a first stopping point by one or more antenna of a rotatable antenna array, the first stopping point of each of the one or more antenna being different;
rotating the one or more antenna from the first stopping point to a second stopping point using the rotatable antenna array;
receiving second location information at the second stopping point by the one or more antenna of the rotatable antenna array, the second stopping point of each of the one or more antenna being different; and
determining a location of the rotatable antenna array using the first location information and the second location information, wherein the location of the rotatable antenna array is determined by calculating a center point for each antenna of the one or more antenna using the first location information and the second location information and then determining a cumulative average of the calculated center points.

2. The method of claim 1, wherein the first stopping point and the second stopping point are point on a circle through which the rotatable antenna array rotates.

3. The method of claim 1, wherein the one or more antenna of the rotatable antenna array include a first antenna, a second antenna, and a third antenna.

4. The method of claim 1, wherein the center point for each antenna is a center position about which each of the antenna of the one or more antenna are rotating.

5. The method of claim 1, wherein the one or more antenna is two or more antennas, wherein the cumulative average is an average of the center points for each antenna of the two or more antennas that is divided by a total number of the two or more antennas.

6. The method of claim 5, wherein the cumulative average represents a pivot point position of the rotating antenna array.

7. The method of claim 1, wherein the rotating antenna array is mounted on a layout device, the method further comprising:
sending the location of the rotatable antenna array to the layout device; and
responsive to the layout device receiving the location of the rotatable antenna array, the layout device projecting a representation of an object on a surface based on the location of the rotatable antenna array.

8. The method of claim 1, wherein the one or more antenna receive signals via one or more of GPS, Ultrawide Band, Bluetooth, RFID, Radio Beacon, Sonar, Radar, and WiFi.

9. A rotating antenna array comprising:
one or more antenna configured to receive signals from a transmitting device, the signals representing location information, the location information including first location information and second location information;
a rotating antenna boom configured to retain the one or more antenna on separate arms of the rotating antenna boom;
a pivot point attachment that retains the rotating antenna boom and causes the rotating antenna boom to rotate about the pivot point attachment;
a motor that actuates a rotation of the rotating antenna boom about the pivot point attachment; and
a position engine that determines a location of the rotating antenna array using the location information from the one or more antenna, wherein the position engine determines the location of the rotating antenna array by calculating a center point for each antenna of the one or more antenna using the first location information and the second location information and then determining a cumulative average of the calculated center points.

10. The rotating antenna array of claim 9, wherein the one or more antenna are configured to rotate from a first stopping point to a second stopping point are points on a circle through which the rotatable antenna boom rotates.

11. The rotating antenna array of claim 10, wherein the one or more antenna are configured to receive the first location information when in the first stopping point and to receive the second location information when in the second stopping point.

12. The rotating antenna array of claim 11, wherein the center point for each antenna is a center position about which each of the antenna of the one or more antenna are rotating.

13. The rotating antenna array of claim 11, wherein the one or more antenna is two or more antennas, wherein the cumulative average is an average of the center points for each antenna of the two or more antennas that is divided by a total number of the two or more antennas.

14. The rotating antenna array of claim 13, wherein the cumulative average represents a position of the pivot point attachment of the rotating antenna array.

15. The rotating antenna array of claim 9, wherein the one or more antenna receive signals via one or more of GPS, Ultrawide Band, Bluetooth, RFID, Radio Beacon, Sonar, Radar, and WiFi.

16. A method comprising:
capturing first location information at a first stopping point, the first location information representing first stopping point antenna positions for a first antenna, a second antenna, and a third antenna, the first antenna, the second antenna, and the third antenna being included in a rotatable antenna array;
rotating the first antenna, the second antenna, and the third antenna to a second stopping point using the rotatable antenna array;
capturing second location information at the second stopping point, the second location information representing second stopping point antenna positions for the first antenna, the second antenna, and the third antenna;
determining first stopping point center point positions for the first antenna, the second antenna, and the third antenna at the first stopping point using the first stopping point antenna positions;
determining second stopping point center point positions for the first antenna, the second antenna, and the third antenna at the second stopping point using the second stopping point antenna positions;
determining cumulative average positions for the first antenna, the second antenna, and the third antenna using the first stopping point center positions and the second stopping point center positions; and
determining a device position using the cumulative average positions for the first antenna, the second antenna, and the third antenna.

17. The method of claim 16, wherein the first stopping point and the second stopping point are points on a circle through which the first antenna, the second antenna, and the third antenna rotate.

18. The method of claim 17, wherein the first antenna, the second antenna, and the third antenna receive signals via one or more of GPS, Ultrawide Band, Bluetooth, RFID, Radio Beacon, Sonar, Radar, Ultrasonic, and WiFi.

* * * * *